(12) United States Patent
Bruguier et al.

(10) Patent No.: US 10,152,965 B2
(45) Date of Patent: Dec. 11, 2018

(54) LEARNING PERSONALIZED ENTITY PRONUNCIATIONS

(71) Applicant: Google LLC, Mountain View, CA (US)

(72) Inventors: Antoine Jean Bruguier, Milpitas, CA (US); Fuchun Peng, Cupertino, CA (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/014,213

(22) Filed: Feb. 3, 2016

(65) Prior Publication Data

US 2017/0221475 A1    Aug. 3, 2017

(51) Int. Cl.
| | |
|---|---|
| *G10L 15/00* | (2013.01) |
| *G10L 15/06* | (2013.01) |
| *G10L 15/065* | (2013.01) |
| *G10L 15/26* | (2006.01) |

(52) U.S. Cl.
CPC .......... *G10L 15/063* (2013.01); *G10L 15/065* (2013.01); *G10L 15/26* (2013.01); *G10L 2015/0635* (2013.01); *G10L 2015/0636* (2013.01)

(58) Field of Classification Search
None
See application file for complete search history.

(56) References Cited

U.S. PATENT DOCUMENTS

| 5,029,200 | A | * | 7/1991 | Haas | ..................... | H04M 3/533 |
|---|---|---|---|---|---|---|
| | | | | | | 379/245 |
| 6,125,206 | A | * | 9/2000 | Yokota | ................. | G06K 9/6255 |
| | | | | | | 382/189 |
| 6,985,865 | B1 | * | 1/2006 | Packingham | ........... | G10L 15/22 |
| | | | | | | 704/270.1 |
| 7,266,495 | B1 | * | 9/2007 | Beaufays | ................ | G10L 15/06 |
| | | | | | | 704/236 |

(Continued)

OTHER PUBLICATIONS

Rao et al., "Automatic Pronunciation Verification for Speech Recognition," ICASSP 2015, Apr. 24, 2015, 5 pages.

(Continued)

*Primary Examiner* — Fariba Sirjani
(74) *Attorney, Agent, or Firm* — Fish & Richardson P.C.

(57) ABSTRACT

Methods, systems, and apparatus, including computer programs encoded on computer storage medium, for implementing a pronunciation dictionary that stores entity name pronunciations. In one aspect, a method includes actions of receiving audio data corresponding to an utterance that includes a command and an entity name. Additional actions may include generating, by an automated speech recognizer, an initial transcription for a portion of the audio data that is associated with the entity name, receiving a corrected transcription for the portion of the utterance that is associated with the entity name, obtaining a phonetic pronunciation that is associated with the portion of the audio data that is associated with the entity name, updating a pronunciation dictionary to associate the phonetic pronunciation with the entity name, receiving a subsequent utterance that includes (Continued)

the entity name, and transcribing the subsequent utterance based at least in part on the updated pronunciation dictionary.

18 Claims, 3 Drawing Sheets

(56) References Cited

U.S. PATENT DOCUMENTS

| | | | | |
|---|---|---|---|---|
| 7,280,963 | B1* | 10/2007 | Beaufays | G10L 15/06 704/236 |
| 7,283,964 | B1* | 10/2007 | Geilhufe | G10L 15/30 704/277 |
| 8,255,223 | B2* | 8/2012 | Wang | G06F 21/31 704/246 |
| 8,798,995 | B1* | 8/2014 | Edara | G06Q 30/0255 704/246 |
| 8,886,545 | B2* | 11/2014 | Meisel | G10L 15/22 704/275 |
| 9,263,032 | B2* | 2/2016 | Meruva | G10L 15/063 |
| 9,460,088 | B1* | 10/2016 | Sak | G06F 17/2881 |
| 9,741,339 | B2* | 8/2017 | Peng | G10L 15/18 |
| 2002/0173966 | A1* | 11/2002 | Henton | G06F 17/273 704/277 |
| 2003/0050779 | A1* | 3/2003 | Riis | G10L 13/08 704/236 |
| 2004/0193420 | A1* | 9/2004 | Kennewick | G06F 17/30654 704/257 |
| 2006/0004572 | A1* | 1/2006 | Ju | G10L 15/06 704/243 |
| 2007/0233487 | A1* | 10/2007 | Cohen | G10L 15/065 704/255 |
| 2009/0067756 | A1* | 3/2009 | Meyer | G06K 9/03 382/310 |
| 2010/0057457 | A1* | 3/2010 | Ogata | G10L 15/065 704/235 |
| 2011/0307241 | A1* | 12/2011 | Waibel | G10L 15/265 704/2 |
| 2012/0232904 | A1* | 9/2012 | Zhu | G10L 15/22 704/254 |
| 2012/0253817 | A1* | 10/2012 | Trinh | H04M 3/4935 704/270 |
| 2013/0030804 | A1* | 1/2013 | Zavaliagkos | G10L 15/26 704/235 |
| 2014/0032216 | A1* | 1/2014 | Roth | G10L 15/063 704/244 |
| 2015/0032455 | A1* | 1/2015 | Gazdzinski | G06Q 30/0251 704/270 |
| 2015/0081293 | A1* | 3/2015 | Hsu | G10L 15/26 704/235 |
| 2015/0106082 | A1* | 4/2015 | Ge | G10L 15/187 704/10 |
| 2015/0243278 | A1* | 8/2015 | Kibre | G10L 15/075 704/243 |
| 2016/0307569 | A1* | 10/2016 | Peng | G10L 15/22 |

OTHER PUBLICATIONS

International Search Report and Written Opinion in International Application No. PCT/US2016/063316, dated Feb. 21, 2017, 14 pages.

International Preliminary Report on Patentability issued in International Application No. PCT/US2016/063316, dated Aug. 16, 2018, 10 pages.

* cited by examiner

LEARNING PERSONALIZED ENTITY PRONUNCIATIONS

FIELD

This specification generally relates to speech recognition.

BACKGROUND

A user of a device may interact with the device in a variety of different ways including, for example, making selections from a displayed group of items using a mouse or touchpad, entering characters via a keyboard, or speaking voice commands into a microphone. When processing voice commands, an automated speech recognizer (ASR) may have difficulty recognizing a voice command accurately if a speaker uses a pronunciation of a particular word that deviates from a canonical pronunciation that is associated with the word in a pronunciation dictionary.

SUMMARY

Aspects of the present disclosure may facilitate implementation of a pronunciation dictionary that can store a different, non-canonical pronunciation of an entity name based on a user's interaction with a mobile device. In some instances, the pronunciation dictionary can adapt to the unique features of a user's voice that may alter the user's pronunciation of certain words. By way of example, a pronunciation dictionary may be initialized so that the entity name "Mara" corresponds to a phonetic pronunciation of "MAW • rra". However, utilizing aspects of the present disclosure, the pronunciation dictionary may learn that a particular user pronounces the entity name "Mara" as "MA • ra". Accordingly, the pronunciation dictionary may learn to associate the pronunciation "MA • ra" with the entity name "Mara" based on interactions with the particular user.

In some aspects, the subject matter embodied in this specification may be embodied in methods that may include the action of receiving audio data corresponding to an utterance that includes a command and an entity name. Additional actions may include generating, by an automated speech recognizer, an initial transcription for a portion of the audio data that is associated with the entity name, receiving a corrected transcription for the portion of the utterance that is associated with the entity name and that is different than the initial transcription, in response to receiving the corrected transcription for the portion of the utterance that is associated with the entity name and that is different than the initial transcription, obtaining a phonetic pronunciation that is associated with the portion of the audio data that is associated with the entity name, updating a pronunciation dictionary to associate the phonetic pronunciation with the entity name, receiving a subsequent utterance that includes the entity name, and transcribing the subsequent utterance based at least in part on the updated pronunciation dictionary.

Other versions include corresponding systems, apparatus, and computer programs, configured to perform the actions of methods, encoded on computer storage devices.

These and other versions may each optionally include one or more of the following features. For instance, in some implementations, receiving the corrected transcription for the portion of the utterance that is associated with the entity name and that is different than the initial transcription may include receiving data indicative of a selection of an entity name from a display of one or multiple entity names, or receiving data indicative of one or multiple characters that were input via a keypad and are indicative of an entity name.

In some aspects, updating a pronunciation dictionary may include identifying a pronunciation dictionary entry that is associated with the entity name, deleting the portion of the entry that corresponds to a phonetic pronunciation of the initial transcription, and storing, in the pronunciation dictionary entry that is associated with the entity name, the phonetic pronunciation that is associated with the obtained phonetic pronunciation.

In certain implementations, the method may include actions for associating a time stamp with at least a portion of the received audio data, and caching one or more portions of the received audio data until a correct transcription of the utterance is identified and the command associated with the received utterance is completed. In such implementations, obtaining a phonetic pronunciation that is associated with the portion of the audio data that is associated with the entity name may include obtaining a portion of the most recently received audio data based on the timestamp associated with at least a portion of the received audio data, generating a phonetic pronunciation of the obtained portion of the most recently received audio data based on a set of phonemes obtained using an acoustic model.

In yet other implementations, the method may include actions that include increasing a global counter associated with the phonetic pronunciation in response to updating a pronunciation dictionary to include the obtained phonetic pronunciation.

In such implementations, determining that the global counter associated with the phonetic pronunciation exceeds a predetermined threshold, and in response to determining that the global counter associated with the phonetic pronunciation has exceeded a predetermined threshold, updating a pronunciation dictionary entry in a global pronunciation dictionary that is associated with entity name to include the phonetic pronunciation associated with the correct transcription.

The details of one or more implementations are set forth in the accompanying drawings and the description below. Other features and advantages will be apparent from the description and drawings, and from the claims.

DETAILED DESCRIPTION

Figure 1A:
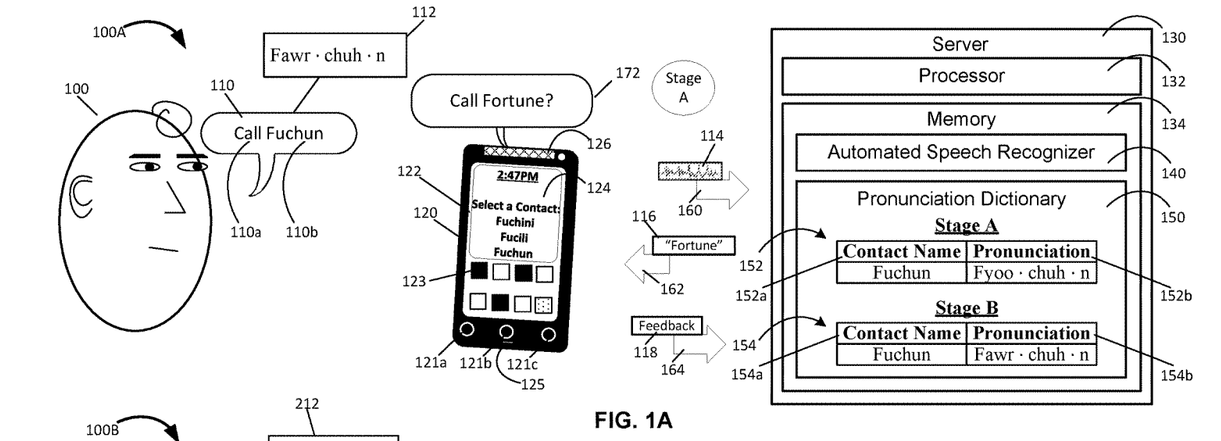
FIGS. 1A and 1B are contextual diagrams showing features of a system for learning personalized entity name pronunciations.

FIG. 1A is a contextual diagram showing features of a system 100A for learning personalized entity name pronunciations. The system 100A may include a user 100, a user's mobile device 120, and a server 130. The mobile device 120 may communicate 160, 162, 164 with server 130 via one or more wired or wireless networks. The networks may include, for example, a wireless cellular network, a wireless local area network (WLAN) or Wi-Fi network, a Third Generation (3G) or Fourth Generation (4G) mobile telecommunications network, a private network such as an intranet, a public network such as the Internet, or any combination thereof. The mobile device 120 may be a mobile phone, smart phone, smart watch, tablet computer, laptop or desktop, e-book reader, music player, PDA, or other stationary or portable devices that may include one or more processors and computer readable media.

The user's mobile device 120 may include one or more physical buttons 121*a*, 121*b*, 121*c*, a graphical user interface 122, a microphone 125, and an output speaker 126. Each of physical buttons 121*a*, 121*b*, 121*c* may be configured to perform a particular function in response to a user selection of the physical button. For instance, the physical button 121*a*, 121*b*, 121*c* may be a power button, a volume button, a home button, or the like. In one implementation, a physical button such as physical button 121*a* may be configured to activate the microphone 125 upon selection of the physical button 121*a*. The graphical user interface 122 may include a capacitive touchscreen interface that is configured to receive input in the form of taps, gestures, or the like that may be input by a user 100 using a stylus, the user's 100 finger, or other pointing implement.

The graphical user interface 122 may be comprised of one or more different portions. Each of the different portions of graphical user interface 122 may be displayed separately, or one-at-a-time, as necessary. Alternatively, one or more of the different portions of the graphical user interface 122 may be displayed at the same time as a split screen, as shown in FIG. 1A. For instance, a first portion of the graphical user interface may provide a display of one or more selectable icons 123. The selectable icons 123 may each correspond to a particular command, a particular application, a folder that groups one or more applications, or the like. In some instances, the selectable icons may be utilized in place of one or more physical buttons 121*a*, 121*b*, 121*c*. For instance, a selectable icon may be provided to function as a home button. Alternatively, for example, a selectable icon may be used to activate the microphone 125. In other implementations, a selectable icon may be configured to open a particular application in response to the selection of the selectable icon. In yet other implementations, selection of a selectable icon may open a folder that triggers the display of additional selectable icons that each correspond to a particular application or a nested folder.

Other portions of the graphical user interface 122 may include a display that may provide one or more prompts 124 for additional information from the user 100. For instance, the display may provide a prompt 124 for user input related to a transcription of at least a portion of a vocalized utterance. Alternatively, display screen may be configured to provide the user with an indication of the current status of a phone call (See FIG. 1B). Yet other types of data may be displayed in a corresponding portion of graphical user interface 122.

The server 130 may be made up of one or more computing devices that each include a processor 132 and a memory 134. The processor 132 may be made up of one or more processors configured to execute instructions associated with applications stored in memory 134. The memory 134 may include one or more memory units that may be comprised of the same, or different, type(s) of storage devices. For instance, memory 134 may include a RAM portion that is configured to store actively running applications. Alternatively, or in addition, memory 134 may include one or more data storage units that may be configured to store data that may be accessed, and transferred to, a RAM portion of memory 134, as necessary.

The applications stored in memory 130 may include, for example, an automated speech recognizer 140 and a personalized pronunciation dictionary 150. The automated speech recognizer 140 may facilitate capabilities such as, for example, converting one or more portions of audio signals 114 received 160 from a mobile device 120 into another form of media. For instance, automated speech recognizer 140 may convert the received audio 114 into text. Converting the received audio signals 114 into text may include, for example, utilizing an acoustic model to identify a set of phonemes that are most likely associated with all, or a portion, of the received audio signals 114. Then, the identified set of phonemes may be mapped to a phonetic pronunciation.

In some implementations, the phonetic pronunciation may, for example, uniquely identify a particular entity name corresponding to a particular entry of personalized pronunciation dictionary 150. Accordingly, automated speech recognizer 140, or another component of server 130, may use the phonetic pronunciation to retrieve a corresponding entity name from the user's personalized pronunciation dictionary 150. In certain instances, however, automated speech recognizer 140 may determine that a personalized pronunciation dictionary 150 does not include any entity names that may be sufficiently identified by the obtained phonetic pronunciation. In such instances, the automated speech recognizer 140 may return 162 the best available transcription 116 to mobile device 120. The best available transcription 116 may be the closest entity name in the personalized pronunciation dictionary 150 that corresponds to the obtained phonetic pronunciation. Alternatively, for example, the best available transcription 116 may be a transcription that was generated by the automated speech recognizer 140 using one or more other speech conversion applications, dictionaries, or the like.

The personalized pronunciation dictionary 150 may include multiple entries that each include information associated with a particular entity. For instance, a personalized pronunciation dictionary 152 in a stage "A" may include one or more entries that each include a contact name 152*a* and a pronunciation 152*b*. The personalized pronunciation dictionary 150 in stage "A" may be initialized with a default set of phonetic pronunciations 152*b* for each entity name 152*a*. The default set of phonetic pronunciations may be based on typical pronunciations 152*b* of each respective entity name 152*a*. A typical pronunciation may be, for example, a pronunciation associated with a word by a standard dictionary. In addition, it should be considered that unique characteristics of a user's voice may change over time, or there may be multiple users of the same phone who each have different voice characteristics. Accordingly, a typical pronunciation may also be, for example, a pronunciation that a user associated with an entity name at some point in the past.

However, the personalized pronunciation dictionary 150 may be configured to store different pronunciations, based on interactions with a user 100 of system 100A. As a result, the particular phonetic pronunciation that is associated with a particular entity may change over time. Such a change to the phonetic pronunciation 152*b* for a particular entity name 152*a* in a first stage "A" may be depicted in FIG. 1 with respect to the transition from a personalized pronunciation dictionary 152 in a first stage "A" to a corresponding personalized pronunciation dictionary 154 that is in a second stage "B". The personalized pronunciation dictionary 154 in stage "B" indicates that the pronunciation for the entity "Fuchun" has been updated to "Fawr • chuh • n" from a typical pronunciation of "Fyoo • chuh • n" that was previously associated with the entity "Fuchun" in personalized pronunciation dictionary 152, stage "A". The personalized pronunciation dictionary 150 may be configured to store any type of pronunciation based on any type of pronunciation system including, for example, the international phonetic alphabet (IPA), the extended speech assessment methods phonetic alphabet (X-SAMPA), or the like.

In one aspect, a user 100 may provide an input to a mobile device 120 that activates the mobile device's 120 microphone 125. For instance, a user 100 may select a physical button 121a that activates the microphone 125. Alternatively, the microphone 125 may be activated by the user uttering a particular voice command. For instance, the microphone 125 may be configured to passively listen to all sounds within range of the microphone 125 in order to detect a particular activation command. Once the microphone 125 detects the particular activation command, the microphone 125 may change its mode of operation to an active listening mode capable of capturing subsequent voice commands from user 100.

Once the microphone has been activated, the user 100 may vocalize an utterance 110 that may be detected by the microphone 125 associated with user's mobile device 120. The utterance 110 may include a command 110a and an entity name 110b. For instance, in the example of FIG. 1, user 100 may vocalize an utterance such as, for example, "Call Fuchun" 110. The command 110a associated with utterance 110 is the "Call" command. The "Call" command may initiate a connection for a voice or video communication with an entity. In this instance, the utterance 110 also identifies an entity 110b "Fuchun," as the entity that is to be called.

Though in this instance, an example of an entity is set forth as the name of a personal contact who may be called, an entity as described herein should not be so limited. Instead, an entity may include, for example, any identifier for any person, place, or thing. For instance, an entity name may include the name of a restaurant such as, for example, CityZen. Alternatively, for example, the entity name may include a street name, for example, Washington Pike, or even a street address such as, for example, 1599 Washington Pike. In other implementations, an entity name may be a city and/or state, such as La Jolla, Calif. In yet other implementations, an entity name may include a landmark such as, for example, Yosemite National Park. Other types of entity names may be utilized by the present disclosure.

Each portion of the utterance 110 may be uniquely pronounced based on characteristics associated with the voice of user 100. The characteristics of a user's 100 voice may include, for example, the user's 100 accent, phoneme choice, preference, or the like, and each may have a unique effect on the user's 100 pronunciation of a particular entity name 110b. In this particular example, though the typical pronunciation for the entity "Fuchun" may be "Fyoo • chuh • n," user 100 has pronounced the entity name "Fuchun" as "Fawr • chuh • n" 112. The microphone 125 may capture the audio signals associated with utterance 110, and transmit 160 the audio signals 114 associated with the utterance 110 to the server 130 that maintains a user's 100 personalized pronunciation dictionary 152 in a first stage "A". The audio signals 114 may include a first portion of the audio signal that corresponds to the command 110a and second portion of the audio signal that corresponds to the entity name 110b.

Server 130 may receive the audio signals 114 that correspond to the utterance 110, and forward the received audio signals 114 to the automated speech recognizer 140. The automated speech recognizer 140 may then extract the portion of the audio signals 114 that corresponds to the entity name 110b. The automated speech recognizer 140 may associate a timestamp with the extracted portion of the audio signals 114, and store the extracted portion of the audio signals 114 in a portion of memory 134 designated to cache incoming portions of audio signals 114 that may correspond to one or more user 100 voice utterances 110. The memory 134 may store the extracted portion of the audio signals 114 indefinitely. Alternatively, however, the memory 134 may only store the extracted portion of the audio signals 114 for a predetermined period of time. For instance, the extracted portion of the audio signals 114 may be stored until a correct transcription of the entity name associated with the extracted portion of audio signals 114 is determined. Alternatively, or in addition, the extracted portion of the audio signals 114 may be stored until the command 110a is completed. The automated speech recognizer 140 may then identify a set of phonemes that are most likely associated with the extracted portion of audio signal 114, and then map the set of phonemes to a phonetic pronunciation.

Based on the example depicted in FIG. 1A, the automated speech recognizer 140 may generate a phonetic transcription for the entity name 110b "Fuchun," as pronounced by the user 100, to be "Fawr • chuh • n." The phonetic pronunciation "Fawr • chuh • n" may then be used to search the user's 100 personalized pronunciation dictionary 152 which exists in a first state "A," prior to any updates, for an entity name that is associated with the phonetic pronunciation "Fawr • chuh • n". In stage "A", personalized pronunciation dictionary 152 does not include any entries that are sufficiently associated with a phonetic pronunciation of "Fawr • chuh • n." Automated speech recognition engine 140 may use one or more other speech conversion processes to determine the nearest phonetic pronunciation of the phonetic pronunciation "Fawr • chuh • n." In the example of FIG. 1A, the automated speech recognition engine 140 may determine that an entity name that sufficiently corresponds to the phonetic pronunciation is "Fortune," and transcribe the extracted portion of the audio signals 114 accordingly. Automated speech recognition engine 140 may then request that server 130 transmits 162 the generated transcription 116 back to the user's 100 mobile device 120.

The server 130 may also transmit 162 additional information to mobile device 120 that may be associated with the transcription 116. For instance, the transcription 116 that may be transmitted 162 to the mobile device 120 may also be associated with an indication that the user's 100 personal pronunciation dictionary 152 in stage "A" did not include any entries that corresponded to the phonetic pronunciation "Fawr • chuh • n." Alternatively, or in addition, the transcription 116 may also be associated with a list one or more contacts in a user's 100 personalized pronunciation dictionary 152, stage "A", that may be the closest match to the generated phonetic pronunciation that corresponds to the extracted portion of audio signals 114. This additional information may be provided to the mobile device 120 by server 130 in order to prompt the user 100 for feedback information that may be used to help the personalized pronunciation dictionary 150 learn the unique entity pronunciation 112 uttered by user 100.

In response to a receipt of the transcription 116 "Fortune," and the additional information transmitted along with transcription 116, the mobile device 120 may prompt 124 the user 100 for feedback information related to the transcription 116. The mobile device 120 may generate the prompt 124, for example, in response to determining that the received transcription 116 was associated with an indication that the user's 100 personal pronunciation dictionary 152 in stage "A" did not include any entries that corresponded to the transcription "Fortune." The prompt 124 may, for example, provide a list of one or more contact names that were stored in the user's 100 personal pronunciation dictionary 152 in stage "A" that are the closet match to the phonetic pronunciation used to generate the transcription 116. In one example, the prompt 124 may ask a user to select the contact name that the user 100 intended to call when the user vocalized the voice utterance 110 with an entity name pronounced "Fawr • chuh • n" 112. For instance, the list of contact names provided to the user 100 may include, Fuchini, Fucili, and Fuchun, each of which may be associated with an entry in the user's 100 personalized pronunciation dictionary 152 in state "A." In some implementations, the list of contact names provided may not be phonetically close to the user's unique pronunciation of the entity name. For instance, the list of contact names provided in the prompt may be phonetically unrelated entity names such as, for example, Edwin, Fuchun, and Steve. In response to the prompt 124, the user selects "Fuchun," as the user 100 knows that the entity name the user 100 vocalized in utterance 110 was "Fuchun." In response to the user's 100 selection of "Fuchun," the mobile device 120 may initiate a call to "Fuchun," and also transmit 164 feedback information 118 to server 130.

Mobile device 120 may also use audio prompts in an effort to obtain feedback from a user 100. For instance, in response to the receipt of a transcription 116, and the additional information transmitted along with transcription 116, the mobile device 120 may ask the user 100 if the user 100 wants to "Call Fortune?" 172. In such an instance, the user 100 may provide one or more subsequent utterances that provide an indication whether the user 100 confirms or denies that the user wants to call "Fortune." Alternatively, or in addition, a user 100 may type in the entity name of the entity the user 100 is trying to call. Other types of feedback information may also be provided by user 100. Such feedback information may similarly be transmitted to server 130 in the same manner as feedback information 118, and then used in a manner similar to feedback information 118, as described below.

The server 130 may receive the feedback information 118, and forward the feedback information 118 to automated speech recognizer 140. The feedback information 118 may include, for example, an indication of the entity name that the user 100 input in response to the prompt 124. In this instance, the feedback information 118 may indicate that the user has selected the entity name "Fuchun." In addition, either before, after, or substantially simultaneously therewith, the automated speech recognizer 140 may retrieve the extracted portion of the audio signals 114 that was originally received, stored, and timestamped. The extracted portion of the audio signals 114 may correspond to the entity name 110*b* that was uniquely pronounced 112 by the user 100 when the user vocalized the utterance 110. The automated speech recognizer 140 may retrieve the extracted portion of the audio signals 114 based on the timestamp associated with the extracted portion of the audio signals 114. For instance, in one implementation, the automated speech recognizer 140 may obtain the extracted portion of the audio signals 140 that was most recently received, extracted, and stored, based on an associated timestamp.

The automated speech recognizer 140 may use the extracted portion of audio signals 114 and the feedback information 118 to teach the personalized pronunciation dictionary 150 the user's 100 unique pronunciation 112 of an entity name 110*b*. For instance, the automated speech recognizer 140 may generate a phonetic pronunciation for the extracted portion of the audio signals 114, as described above. Alternatively, the automated speech recognizer 140 may retrieve a previously generated phonetic pronunciation that corresponds to the extracted portion of the audio signals 114 that may have been generated, and stored, in response to the original receipt of audio signals 114. In this instance, the generated phonetic pronunciation of the extracted portion of the audio signal 114 that corresponds to the user's 100 unique pronunciation 112 of the entity name 110*b* in the vocalized utterance 110 may be "Fawr • chuh • n". Automated speech recognizer 140 may then identify the entry from personalized pronunciation dictionary 152 that corresponds to the entity name 152 "Fuchun". Next, automated speech recognizer 140 may update the personalized pronunciation dictionary entry associated with the entity "Fuchun" such that the entry's initial pronunciation of "Fyoo • chuh • n" is replaced by the user's 100 unique pronunciation "Fawr • chuh • n". Replacing the initial pronunciation that corresponds to the entry that is associated with the entity name "Fuchun" with the user's 100 unique pronunciation "Fawr • chuh • n" transitions the user's personalized pronunciation dictionary 150 into stage "B". In stage "B", the user's 100 personalized pronunciation dictionary 154 includes an entry that associates the entity name 154*a* "Fuchun" with the user's 100 unique pronunciation "Fawr • chuh • n".

Figure 1B:
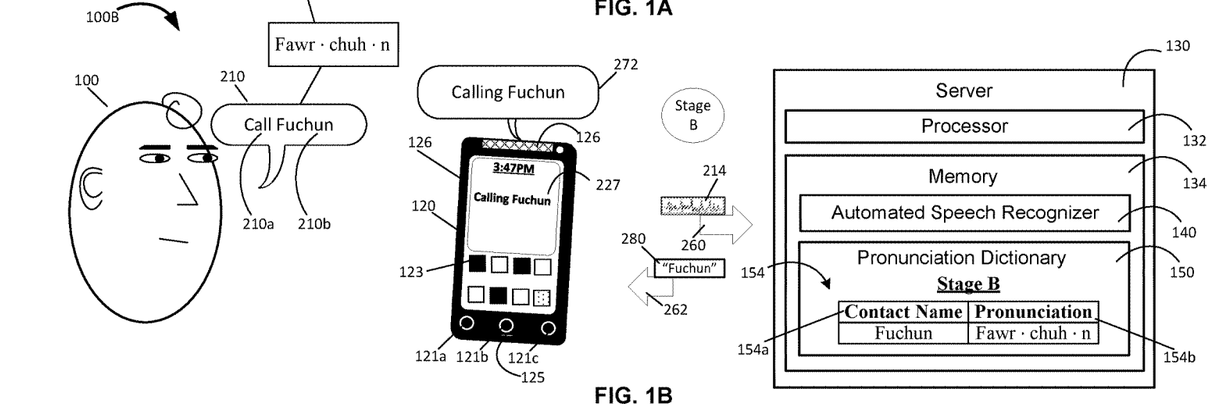

FIG. 1B is a contextual diagram showing features of a system 100B for learning personalized contact pronunciations. The system 100B may be substantially similar to the system 100A depicted in FIG. 1A. However, the system 100B may utilize a user's personalized pronunciation dictionary 154 that has transitioned to stage "B" after learning the user's 100 unique pronunciation 112 of the entity name "Fuchun".

Once the microphone has been activated, the user 100 may vocalize an utterance 210 that may be detected the microphone 125 associated with user's mobile device 120. The utterance 210 may be substantially the same utterance as the utterance 110 that was vocalized by the user 100 in the example of system 100A. For instance, the user 100 may uniquely pronounce the entity name 210*b* "Fuchun" as "Fawr • chuh • n" in the same, or substantially similar, manner as the user uniquely pronounced the entity name "Fuchun" in the example of system 100A. Similarly, the command 210*a* associated with the vocalized utterance 210 is the same "Call" command that was associated with the vocalized utterance 110. However, system 100B may process the audio signals that correspond to the utterance 210 differently because the user's personalized pronunciation dictionary 154 in stage "B" has learned the user's 100 unique pronunciation of the entity name "Fuchun."

The microphone 125 may capture the audio signals associated with utterance 210, and transmit 260 the audio signals 214 associated with the utterance 210 to the server 130 that maintains a user's personalized pronunciation dictionary 154 in a second stage "B". The audio signals 214 may include a first portion of the audio signal that corresponds to the command 210*a* and second portion of the audio signal that corresponds to the entity name 210*b*. The audio signals 214 may be substantially similar to the audio signals 114, as the audio signals 214 correspond to a vocalized utterances 210 that is substantially similar to the vocalized utterance 110.

Server 130 may receive the audio signals 214 that correspond to the utterance 210, and forward the received audio signals 214 to the automated speech recognizer 140. The automated speech recognizer 140 may then extract the portion of the audio signals 214 that corresponds to the entity name 210b. The automated speech recognizer 140 may associate a timestamp with the extracted portion of the audio signals 214, and store the extracted portion of the audio signals 214 in a portion of memory 134 designated to cache incoming portions of audio signals 214 that may correspond to one or more user 100 voice utterances 110. The memory 134 may store the extracted portion of the audio signals 214 indefinitely. Alternatively, however, the memory 134 may only store the extracted portion of the audio signals 214 for a predetermined period of time. For instance, the extracted portion of the audio signals 214 may be stored until a correct transcription of the entity name associated with the extracted portion of audio signals 215 is determined. Alternatively, or in addition, the extracted portion of the audio signals 214 may be stored until the command 210a is completed. The automated speech recognizer 140 may then identify a set of phonemes that are most likely associated with the extracted portion of audio signals 214, and then map the set of phonemes to a phonetic pronunciation.

Based on the example depicted in FIG. 1B, the automated speech recognizer 140 may generate a phonetic transcription for the entity name 210b "Fuchun," as pronounced by the user 100, to be "Fawr • chuh • n." The phonetic pronunciation "Fawr • chuh • n" may then be used to search the user's 100 personalized pronunciation dictionary 154 which currently exists in a second state "B," after at least one update, for an entity name that is associated with the phonetic pronunciation "Fawr • chuh • n". In stage "B", the personalized pronunciation dictionary 154 includes an entry that is sufficiently associated with a phonetic pronunciation of "Fawr • chuh • n." For instance, the personalized pronunciation dictionary 154 includes an entry with a contact name 154a "Fuchun" that the personalized pronunciation dictionary 154 has learned to associate with the user's 100 unique pronunciation "Fawr • chuh • n". The matching phonetic pronunciations indicate that the extracted portion of the audio 214 may be transcribed as "Fuchun". Automated speech recognition engine 140 may then request that server 130 transmits 262 the generated transcription 280 back to the user's 100 mobile device 120.

The server 130 may also transmit 262 additional information to mobile device 120 that may be associated with the transcription 280. For instance, transcription 280 transmitted to the mobile device 120 at 262 may also be associated with an indication that the user's 100 personal pronunciation dictionary 154 in stage "B" included a particular entity name that corresponds to the phonetic pronunciation "Fawr • chuh • n." Alternatively, or in addition, the transcription 280 may also be associated with an indication that transcription of audio 214 was successful and/or an instruction to initiate the user's command 210a. For example, a particular data flag, a particular data bit, or the like may be returned to provide an indication of a successful transcription. This additional information may be provided to the mobile device 120 by server 130 in order to instruct the mobile device 120 to perform the command 210a. In the example of system 100B, the additional information may instruct, or otherwise trigger, the mobile device 120 to call "Fuchun." The status 227 of the call may be displayed via the graphical user interface 120. Alternatively, or in addition, the mobile device's speaker 126 may provide an output alert that indicates that a call is being attempted which recites, for example, "Calling Fuchun."

The examples of systems 100A and 100B with respect to FIGS. 1A and 1B, respectively, utilize a vocalized utterance 110, 210 that include a "Call" command 110a, 210a. However, the present disclosure need not be so limited. For instance, various other commands that may be uttered, processed, and executed in accordance with the present disclosure. For instance, a user 100 may vocalize an utterance such as "Directions to Yosemite National Park." The mobile device's 120 microphone 125 may capture the audio signals corresponding to the utterance, and transmit the audio signals to the server 130. The server 130 may similarly extract the portion of the audio signal that corresponds to the entity name, which in this instance may be "Yosemite National Park," and then associate the extracted portion of the audio signal with a timestamp.

The server 130 may pass the extracted portion of the audio signal to the automated recognition unit 140. The automated recognition unit 140 may then obtain a set of phonemes using an acoustic model, and then generate a phonetic pronunciation of the extracted portion of the audio that corresponds to "Yosemite National Park" based on the set of obtained phonemes. The automated recognition unit 140 may further search a personalized geographic database that includes a variety of different points of interest based on the generated phonetic pronunciation. If an entry of the personalized geographic database is not identified as being associated with a phonetic pronunciation corresponding to the generated phonetic pronunciation, the server 130 may utilize the automated speech recognizer 140 to identify the closest transcription of the generated phonetic pronunciation. The closest transcription may be transmitted to the mobile device 120, and presented to the user 100 via prompt that includes a request for feedback information and/or one or more of the closest matches that may have been identified via the search of the personalized geographic database. Any received feedback information may be transmitted back to the server 130, and used to update the personalized geographic database based on the stored audio signals, and the feedback information, in the manner described above. Once the personalized geographic database has learned how the user pronounces the entity name "Yosemite National Park," the automated speech recognizer 140 may properly transcribe the entity name when received in an audio signal, look up location information associated with the transcribed entity name, and provide location information to the mobile device 120 that may be used by the mobile device 120 to help a user navigate to the "Yosemite National Park." Yet other types of commands may be utilized by the present disclosure such as, for example, an email command, a text message command, or the like.

Accordingly, aspects of the present disclosure are not limited to any particular kind of application, and instead may apply to various different types of mobile applications that may be configured to receive voice commands including, for example, a telephone application, a messaging application, an email application, a map application, an entertainment application, or the like.

The examples described with reference to FIGS. 1A and 1B describe a mobile device 120 interacting with a server 130. However, it is also contemplated that any of the functionality described as being performed by server 130 may also be performed by the mobile device 120. For instance, the actions performed by the processor 132, automated speech recognizer 140, and/or the pronunciation dictionary 150 may be performed by the mobile device 120. In such implementations, or other implementations, a portion, or all, of the pronunciation dictionary 150 may be stored on the mobile device 120 instead of the server 130.

Figure 2:
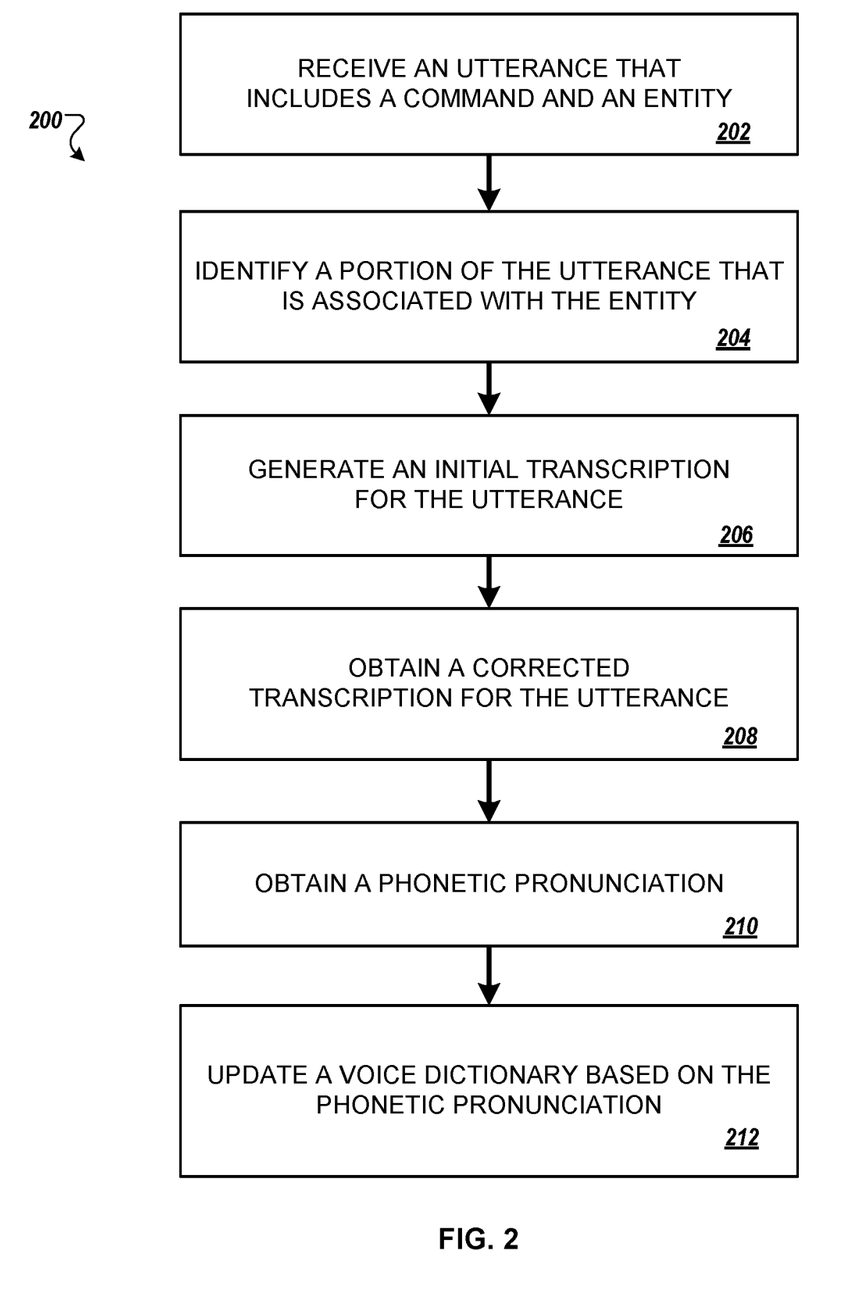
FIG. 2 is a flowchart of an example of a process that may be utilized to learn contact pronunciations in a personalized global pronunciation dictionary.

FIG. 2 is a flowchart of a example of a process 200 that may be utilized to learn contact pronunciations in a personalized pronunciation dictionary.

The process 200 may begin with a server 230 receiving 202 an utterance from a user 100 that includes a command and an entity. The utterance may be in the form of a set of audio signals. The server 230 may forward the received utterance to an automated speech recognizer that extracts 204 a portion of the utterance that is associated with the entity name. The extracted portion of the utterance corresponding to the entity name may then be associated with a timestamp, and stored in the memory associated with the server 230.

The automated speech recognizer may generate 206 an initial transcription of the extracted portion of the audio signals. An initial transcription of the extracted portion of the audio signals may be generated by implementing a series of one or more stages. For instance, the automated speech recognizer may use a model such as an acoustic model in order to identify a set of phonemes that may be associated with the extracted portion of the audio signals. Then, the phonemes may be mapped to a phonetic pronunciation that corresponds to the extracted portion of the audio signals. The phonetic pronunciation may then be used to retrieve an entity name from a user's personalized pronunciation dictionary. To the extent that an entry of the user's personalized pronunciation dictionary that is associated with a phonetic pronunciation that sufficiently matches the generated phonetic pronunciation cannot found, the automated search recognition unit may pick the closest match available to be utilized as the initial transcription. Alternatively, other methods may be used to identify a closest possible initial transcription of the extracted portion of the audio signals. For instance, certain speech to text conversion processes may be implemented to generate a initial transcription that is independent of the user's personalized pronunciation dictionary. Once generated, the initial transcription may be transmitted to a user's 100 mobile device 120 with additional information that may trigger the mobile device 120 to request feedback from user 100 regarding the transcription.

In some implementations, the server may obtain a correct transcription for the extracted portion of the audio signal at 208. The correct transcription may be based on, for example, feedback received from the user 100. For instance, in response to a initial transcription 116 that is received by the mobile device 120, the mobile device 120 may prompt 124 a user 100 for feedback related to the initial transcription. Alternatively, or in addition, prompt 124 may display a list of one or more correct transcriptions, as shown in FIG. 1A. The user 100 may select one of the provided correct transcriptions, and the selected correct transcription may be transmitted 164 to the server 230 as feedback information 118. In some instances, the feedback information 118 may include a correct transcription that is different than the initial transcription.

Alternatively, however, there may be instances the initial transcription is a sufficiently adequate transcription. For instance, a user 100 may determine that the initial transcription 116 is correct, and needs to be added as a new entry to the personalized pronunciation dictionary. A user may initiate selection, or confirmation, of the initial transcription by, for example, confirming that the mobile device should call "Fortune" in response to a prompt 172 from mobile device 120. If the user 100 confirms the call to "Fortune," the user 100 may input Fortune's contact information to facilitate completion of the call. Then Fortune's name may be sent back to the server 130 to be added to the personalized pronunciation dictionary, along with the generated phonetic pronunciation. Thus, in some implementations, the feedback information 118 may include feedback that indicates that the initial transcription 116 is a sufficiently adequate transcription.

The server 230 may receive the correct transcription, and forward the correct transcription to the automated speech recognizer. The automated speech recognizer may obtain the extraction portion of the user's 100 audio signals that were previously stored based on timestamp. For instance, the automated speech recognizer may retrieve the extracted portion of the user's 100 audio signals that were associated with the most recent time stamp. The automated speech recognizer may then generate a phonetic pronunciation that corresponds to the extracted portion of the user's audio signals, as described above. Then, the automated speech recognizer may associate 210 the generated phonetic pronunciation with the received correct transcription. The generated phonetic pronunciation may correspond to the user's 100 unique pronunciation of an entity name.

The automated speech recognizer may then update 212 an entry in the personalized pronunciation dictionary that includes an entity name that corresponds to the correct transcription based on the generated phonetic pronunciation. In some implementations, updating an entry in the personalized pronunciation dictionary may include replacing an initial pronunciation of an entity name with a user's unique pronunciation of the entity name by storing the generated phonetic pronunciation in the personalized pronunciation dictionary in place of the initial pronunciation of the entity name. This may include, for example, deleting the initial pronunciation of the entity name from the personalized pronunciation dictionary. Alternatively, updating an entry in the personalized pronunciation dictionary may include storing both the entry's initial pronunciation and the generated phonetic pronunciation, and then assigning a greater weight, rank, or score to the generated phonetic pronunciation, which may be indicative of the user's unique pronunciation. Alternatively, the system may store both the entry's initial pronunciation and the generated phonetic pronunciation in the personalized pronunciation dictionary, and both pronunciations may be considered by a speech recognizer during transcription of an uttered entity name. Alternatively, however, in some implementations, the generated phonetic transcription may be stored in a location that is separate from, and generally independent of, the personalized pronunciation dictionary. In such implementations, updating an entry in the personalized pronunciation dictionary may involve merely creating a conceptual link between a personalized pronunciation dictionary entry that corresponds to the correct transcription and another storage location that maintains one or more generated phonetic transcriptions.

Figure 3:
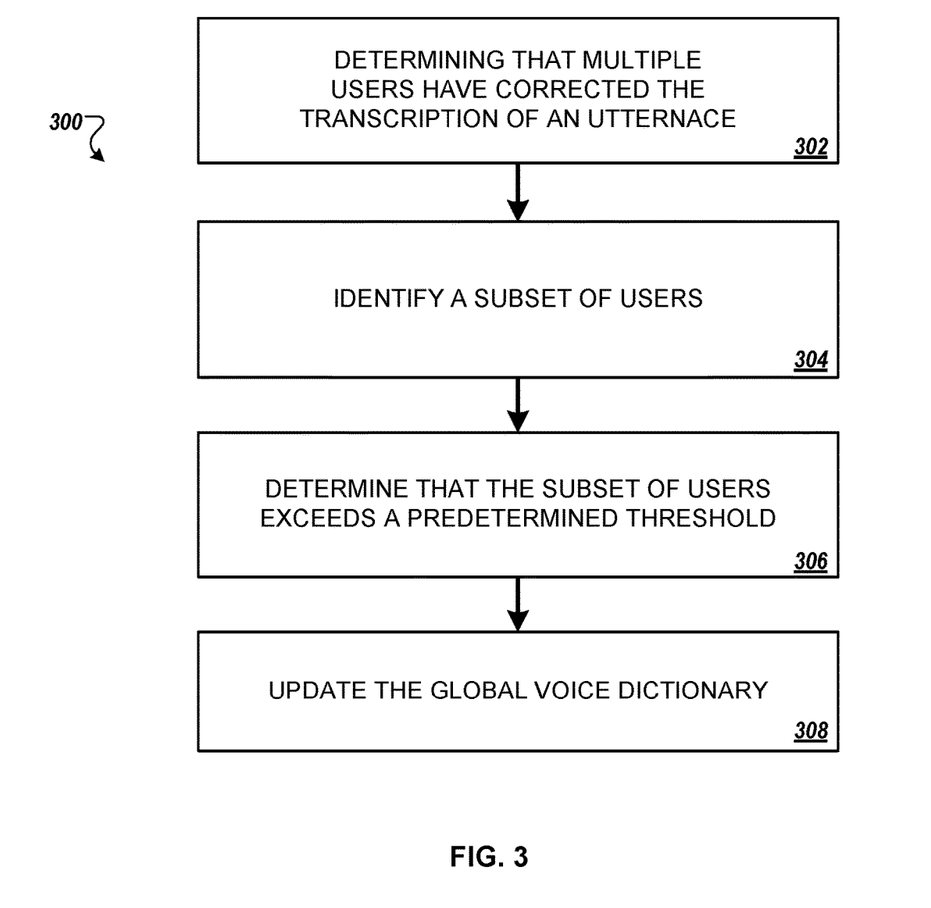
FIG. 3 is a flowchart of an example of a process that may be utilized to learn entity pronunciations in a global pronunciation dictionary.

FIG. 3 is a flowchart of an example of a process 300 that may be utilized to learn entity pronunciations in a global pronunciation dictionary.

In some instances, the system 100A may also include a global pronunciation dictionary that may be shared amongst a set of multiple users. Such a global pronunciation dictionary may be beneficial in certain geographic regions where large numbers of a particular population may each respectively share one or more particular voice peculiarities such as, for example, the same voice pitch, tone, emotion, accent, or the like. In such instances, the global pronunciation dictionary may be utilized in place of, or in addition to, personalized pronunciation dictionary 150. For instance, global pronunciation dictionary may provide an alternative database that automated speech recognizer may search in order to obtain the closest transcription match for a particular portion of audio signals corresponding to an entity name. Alternatively, or in addition, personalized pronunciation dictionary 150 and the global pronunciation dictionary may be viewed as the same pool of data using one or more storage virtualization techniques. The global pronunciation dictionary may function in a substantially similar manner to personalized pronunciation dictionary 150, with the exception of the particular functionality of the global pronunciation dictionary set forth below.

A process 300 for learning entity pronunciations in a global pronunciation dictionary may begin by determining 302 that the transcription of a particular utterance has been corrected by a plurality of different, independent users. The server 130 may then analyze each of the multiple unique phonetic pronunciations that were generated for each of the plurality of different users to identify 304 a subset of users that have associated the same unique phonetic pronunciation with a particular entity name. A unique phonetic pronunciation for a particular entity name may be, for example, the unique phonetic pronunciation "Chow • da hous" for the entity name "Chowder House," which may be typically associated with the phonetic pronunciation "Chow • der hous". Server 130 may maintain a counter that tracks the number of individual users that have associated the same unique phonetic pronunciation with a particular entity name. Server 130 may then determine if the subset of users that have associated the same unique phonetic pronunciation with the particular entity exceeds a predetermined threshold. If it is determined 306 that the number of users that have associated the same unique phonetic pronunciation with the same entity name exceeds a predetermined threshold, the unique phonetic pronunciation may be used to update 308 the global pronunciation dictionary for the particular entity based on the unique phonetic pronunciation.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method comprising:
   receiving audio data corresponding to an utterance that is spoken by a user of a device and that includes a voice command trigger term and an entity name that is a proper noun;
   generating, by an automated speech recognizer, a first phonetic representation of a first portion of the utterance that is associated with the entity name that is a proper noun, wherein the first phonetic pronunciation does not phonetically correspond to a previously available phonetic pronunciation of the entity name;
   generating, by the automated speech recognizer, an initial transcription that (i) is based on the first phonetic representation of the first portion of the utterance, and (ii) includes a transcription of a term that is not a proper noun;
   in response to the generation of the initial transcription that includes a transcription of the term that is not a proper noun, prompting a user for feedback, wherein prompting the user for feedback comprises:
      providing, for output to the user on a graphical user interface of the device, a representation of the initial transcription that (i) is based on the first phonetic pronunciation of the first portion of the utterance, and (ii) includes the transcription of the term that is not a proper noun;
      providing, for output to the user on the graphical user interface, multiple entity names from a set of entity names stored in the pronunciation dictionary, wherein the multiple entity names that are provided for output on the graphical user interface include both (i) entity names that are phonetically close to the entity name included in the utterance, and (ii) entity names that are phonetically unrelated to the entity name included in the utterance; and
   receiving data corresponding to a selection by the user of a particular entity name of the multiple entity names;
   generating a different transcription based on the received data corresponding to the particular entity name selected by the user, wherein the different transcription includes an entity name that does not phonetically correspond to the first phonetic representation;
   updating the pronunciation dictionary to associate (i) the first phonetic representation of the first portion of the utterance that corresponds to the portion of the utterance that is associated with the entity name that is a proper noun with (ii) the entity name in the pronunciation dictionary corresponding to the different transcription that does not phonetically correspond to the first phonetic representation;
   receiving a subsequent utterance that includes the entity name; and
   transcribing the subsequent utterance based at least in part on the updated pronunciation dictionary.

2. The method of claim 1, wherein updating a pronunciation dictionary further comprises:
   identifying a pronunciation dictionary entry that is associated with the entity name;
   deleting the portion of the entry that corresponds to a phonetic representation of the initial transcription; and
   storing, in the pronunciation dictionary entry that is associated with the entity name, the phonetic representation that is associated with the first phonetic representation.

3. The method of claim 1, further comprising:
   associating a time stamp with at least a portion of the received audio data that is associated with the first portion of the utterance; and
   caching one or more portions of the received audio data until the different transcription of the utterance is identified and the command associated with the received utterance is completed.

4. The method of claim 3, further comprising:
   identifying a most recently received audio data based on the timestamp; and
   generating a phonetic representation of the first portion of the utterance that is represented by the obtained portion of the most recently received audio data based on a set of phonemes obtained using an acoustic model.

5. The method of claim 1, further comprising:
in response to updating a pronunciation dictionary to include the first phonetic representation, increasing a global counter associated with the first phonetic representation.

6. The method of claim 5, further comprising:
determining that the global counter associated with the first phonetic representation satisfies a predetermined threshold; and
in response to determining that the global counter associated with the first phonetic pronunciation has exceeded a predetermined threshold, updating a pronunciation dictionary entry in a global pronunciation dictionary that is associated with the entity name to include the first phonetic representation associated with the different transcription.

7. A system comprising:
one or more computers and one or more storage devices storing instructions that are operable, when executed by the one or more computers, to cause the one or more computers to perform operations comprising:
receiving audio data corresponding to an utterance that is spoken by a user of a device and that includes a voice command trigger term and an entity name that is a proper noun;
generating, by an automated speech recognizer, a first phonetic representation of a first portion of the utterance that is associated with the entity name that is a proper noun, wherein the first phonetic pronunciation does not phonetically correspond to a previously available phonetic pronunciation of the entity name;
generating, by the automated speech recognizer, an initial transcription that (i) is based on the first phonetic representation of the first portion of the utterance, and (ii) includes a transcription of a term that is not a proper noun;
in response to the generation of the initial transcription that includes a transcription of the term that is not a proper noun, prompting a user for feedback, wherein prompting the user for feedback comprises:
providing, for output to the user on a graphical user interface of the device, a representation of the initial transcription that (i) is based on the first phonetic pronunciation of the first portion of the utterance, and (ii) includes the transcription of the term that is not a proper noun;
providing, for output to the user on the graphical user interface, multiple entity names from a set of entity names stored in the pronunciation dictionary, wherein the multiple entity names that are provided for output on the graphical user interface include both (i) entity names that are phonetically close to the entity name included in the utterance, and (ii) entity names that are phonetically unrelated to the entity name included in the utterance; and
receiving data corresponding to a selection by the user of a particular entity name of the multiple entity names;
generating a different transcription based on the received data corresponding to the particular entity name selected by the user, wherein the different transcription includes an entity name that does not phonetically correspond to the first phonetic representation;
updating the pronunciation dictionary to associate (i) the first phonetic representation of the first portion of the utterance that corresponds to the portion of the utterance that is associated with the entity name that is a proper noun with (ii) the entity name in the pronunciation dictionary corresponding to the different transcription that does not phonetically correspond to the first phonetic representation;
receiving a subsequent utterance that includes the entity name; and
transcribing the subsequent utterance based at least in part on the updated pronunciation dictionary.

8. The system of claim 7, wherein updating a pronunciation dictionary further comprises:
identifying a pronunciation dictionary entry that is associated with the entity name;
deleting the portion of the entry that corresponds to a phonetic representation of the initial transcription; and
storing, in the pronunciation dictionary entry that is associated with the entity name, the phonetic representation that is associated with the first phonetic representation.

9. The system of claim 7, wherein the operations further comprise:
associating a time stamp with at least a portion of the received audio data that is associated with the first portion of the utterance; and
caching one or more portions of the received audio data until the different transcription of the utterance is identified and the command associated with the received utterance is completed.

10. The system of claim 7, wherein the operations further comprise:
identifying a most recently received audio data based on the timestamp; and
generating a phonetic representation of the first portion of the utterance that is represented by the obtained portion of the most recently received audio data based on a set of phonemes obtained using an acoustic model.

11. The system of claim 7, wherein the operations further comprise:
in response to updating a pronunciation dictionary to include the first phonetic representation, increasing a global counter associated with the first phonetic representation.

12. The system of claim 11, wherein the operations further comprise:
determining that the global counter associated with the first phonetic representation satisfies a predetermined threshold; and
in response to determining that the global counter associated with the first phonetic pronunciation has exceeded a predetermined threshold, updating a pronunciation dictionary entry in a global pronunciation dictionary that is associated with the entity name to include the first phonetic representation associated with the different transcription.

13. A non-transitory computer-readable medium storing software comprising instructions executable by one or more computers which, upon such execution, cause the one or more computers to perform operations comprising:
receiving audio data corresponding to an utterance that is spoken by a user of a device and that includes a voice command trigger term and an entity name that is a proper noun;
generating, by an automated speech recognizer, a first phonetic representation of a first portion of the utterance that is associated with the entity name that is a proper noun, wherein the first phonetic pronunciation does not phonetically correspond to a previously available phonetic pronunciation of the entity name;

generating, by the automated speech recognizer, an initial transcription that (i) is based on the first phonetic representation of the first portion of the utterance, and (ii) includes a transcription of a term that is not a proper noun;

in response to the generation of the initial transcription that includes a transcription of the term that is not a proper noun, prompting a user for feedback, wherein prompting the user for feedback comprises:

providing, for output to the user on a graphical user interface of the device, a representation of the initial transcription that (i) is based on the first phonetic pronunciation of the first portion of the utterance, and (ii) includes the transcription of the term that is not a proper noun;

providing, for output to the user on the graphical user interface, multiple entity names from a set of entity names stored in the pronunciation dictionary, wherein the multiple entity names that are provided for output on the graphical user interface include both (i) entity names that are phonetically close to the entity name included in the utterance, and (ii) entity names that are phonetically unrelated to the entity name included in the utterance; and receiving data corresponding to a selection by the user of a particular entity name of the multiple entity names;

generating a different transcription based on the received data corresponding to the particular entity name selected by the user, wherein the different transcription includes an entity name that does not phonetically correspond to the first phonetic representation;

updating the pronunciation dictionary to associate (i) the first phonetic representation of the first portion of the utterance that corresponds to the portion of the utterance that is associated with the entity name that is a proper noun with (ii) the entity name in the pronunciation dictionary corresponding to the different transcription that does not phonetically correspond to the first phonetic representation;

receiving a subsequent utterance that includes the entity name; and transcribing the subsequent utterance based at least in part on the updated pronunciation dictionary.

14. The computer-readable medium of claim 13, wherein updating a pronunciation dictionary further comprises:

identifying a pronunciation dictionary entry that is associated with the entity name;

deleting the portion of the entry that corresponds to a phonetic representation of the initial transcription; and storing, in the pronunciation dictionary entry that is associated with the entity name, the phonetic representation that is associated with the first phonetic representation.

15. The computer-readable medium of claim 13, wherein the operations further comprise:

associating a time stamp with at least a portion of the received audio data that is associated with the first portion of the utterance; and caching one or more portions of the received audio data until the different transcription of the utterance is identified and the command associated with the received utterance is completed.

16. The computer-readable medium of claim 13, wherein obtaining a phonetic representation that is associated with the manually selected term comprises:

identifying a most recently received audio data based on the timestamp; and generating a phonetic representation of the first portion of the utterance that is represented by the obtained portion of the most recently received audio data based on a set of phonemes obtained using an acoustic model.

17. The computer-readable medium of claim 13, wherein the operations further comprise:

in response to updating a pronunciation dictionary to include the first phonetic representation, increasing a global counter associated with the first phonetic representation.

18. The computer-readable medium of claim 13, wherein the operations further comprise:

determining that the global counter associated with the first phonetic representation satisfies a predetermined threshold; and in response to determining that the global counter associated with the first phonetic pronunciation has exceeded a predetermined threshold, updating a pronunciation dictionary entry in a global pronunciation dictionary that is associated with the entity name to include the first phonetic representation associated with the different transcription.

* * * * *